Sept. 22, 1936.   L. S. DEITZ, JR., ET AL   2,055,195
MANUFACTURE OF PURIFIED ZINC
Filed May 1, 1935   2 Sheets-Sheet 1

INVENTORS
L. S. DIETZ JR.
B. MANSFIELD
BY
ATTORNEY

INVENTORS L. S. DIETZ JR.
B. MANSFIELD

Patented Sept. 22, 1936

2,055,195

UNITED STATES PATENT OFFICE 2,055,195

MANUFACTURE OF PURIFIED ZINC

Louis Scott Deitz, Jr., Metuchen, N. J., and Bernard Mansfield, Tottenville, N. Y., assignors to Nassau Smelting & Refining Company, New York, N. Y., a corporation of New York Application May 1, 1935, Serial No. 19,140

20 Claims. (Cl. 75—88)

This invention relates to the manufacture of purified zinc, and more particularly to methods of making zinc dust and spelter.

Zinc spelter and zinc dust have been produced heretofore from impure materials containing zinc, such as die castings, zinc drosses from die casting and galvanizing processes, and other forms of scrap zinc. Zinc-bearing materials of this nature contain many undesirable impurities, most of which are removed or materially diminished in the manufacture of the finished product. Some forms of raw or virgin zinc also contain unwanted impurities. The usual process of making zinc spelter and zinc dust is to distil the zinc from a charge of impure material at a temperature at which the zinc will vaporize, but at which large quantities of the undesired ingredients in the charge will not vaporize, and then to condense the resulting zinc vapor in a condenser designed to cause the zinc to collect in the form of a liquid or solid body, or as dust, depending upon which product is desired. In the processes formerly used the bulk of the impurities in the scrap zinc were retained in the distilling retort, but some impurities, particularly lead, tended to distil over with the zinc and contaminated the finished product. For some purposes, zinc containing a small amount of lead is satisfactory, but many processes require the use of zinc which is as free from lead as possible. An example of this is the use of zinc dust as a reducing agent in the manufacture of fine chemicals. The presence of lead in zinc dust used for this purpose is very undesirable and zinc dust made in the usual way from zinc scraps containing appreciable quantities of lead is not suitable.

The objects of the invention are to provide metallic zinc and zinc dust of a desired purity and great uniformity, and to supply economical, simple and effective methods of producing metallic zinc and zinc dust having these characteristics.

These objects are attained in accordance with the invention by distilling zinc from impure materials containing zinc in the presence of a metal, such as iron, which inhibits or retards the distillation of lead, and condensing the resulting zinc vapor in a suitable condenser.

The above described and other objects and features of the invention will be apparent from the following detailed description taken in connection with the annexed drawings, in which—

Figure 1:
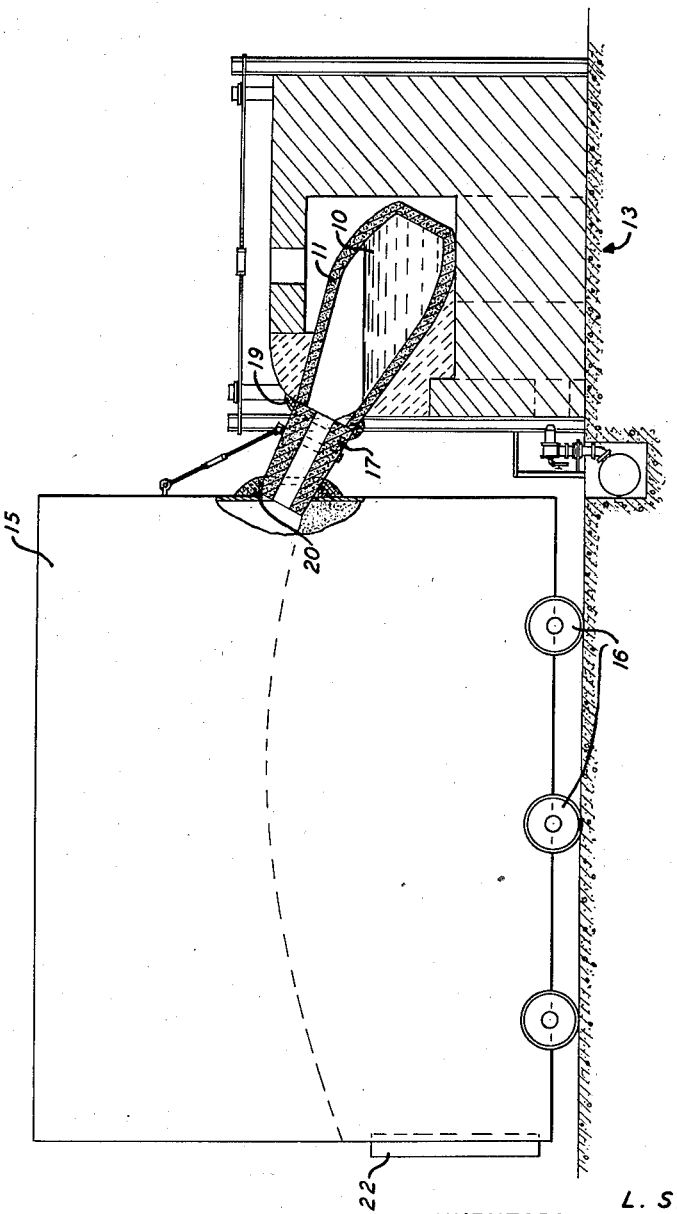
Figure 2:
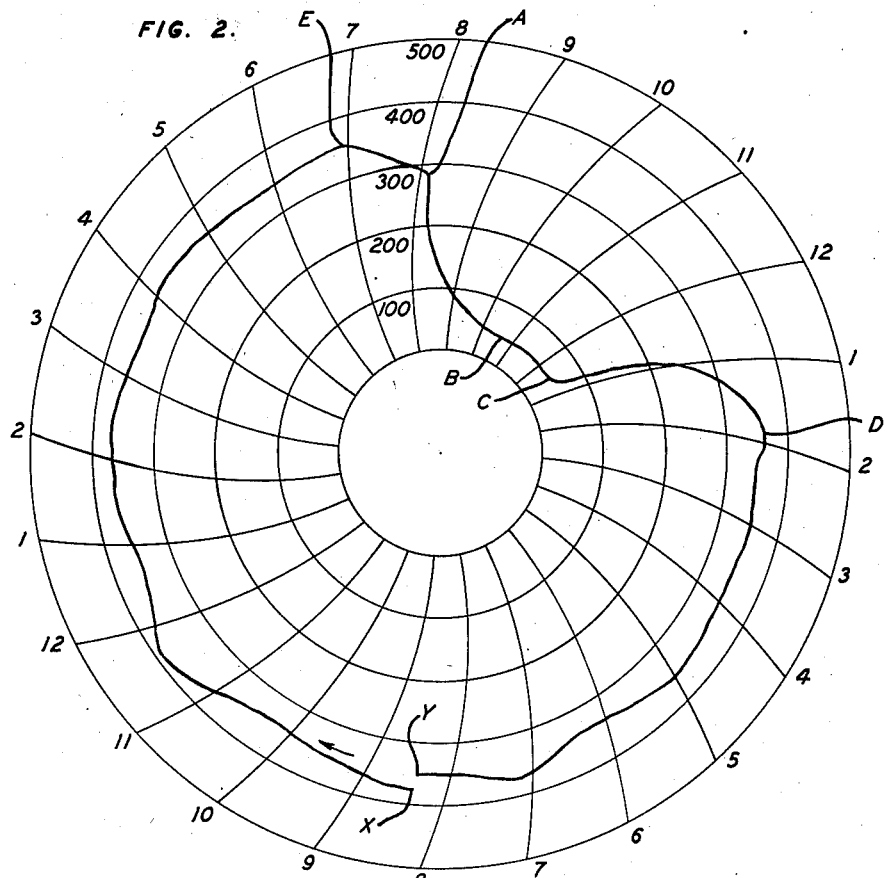
Figure 3:
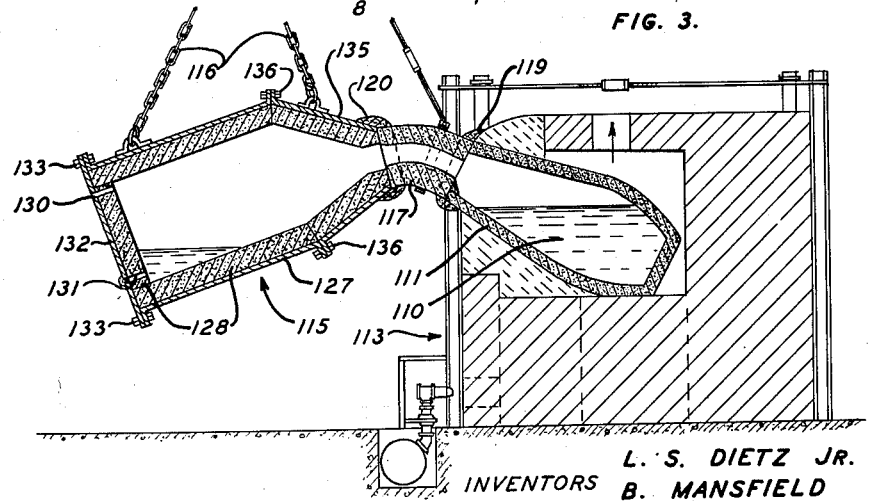

Fig. 1 is a side view, partly in section, of an apparatus designed to produce zinc dust, Fig. 2 is a temperature-time chart showing the temperatures which obtain at a predetermined point within a portion of the apparatus shown in Fig. 1 during the operation thereof, and Fig. 3 is a vertical sectional view of an apparatus designed to produce zinc spelter.

In practicing the invention, a charge 10 of impure zinc, such as scrap zinc or impure raw zinc, and sufficient iron to retard or inhibit the distillation of the lead in the impure zinc is added to a retort 11. In the preferred embodiment of the invention the quantity of iron present in the charge is about three to four parts for each part of lead in the scrap zinc, a ratio of 3.5 parts of iron to 1 part of lead having proved to be a suitable one. The iron employed may be in any desired form, but ordinary scrap iron is a satisfactory material to add to the charge to adjust the iron content to the desired value.

The retort 11, which is made of graphite or other suitable refractory material, is supported in a furnace designated generally by the numeral 13, which is heated by an oil burner or by any other suitable means. If the final product to be made is zinc dust, a condenser or dust box 15 is rolled on wheels 16—16 or otherwise advanced into a position adjacent the retort 11 so that a connector 17 carried by the condenser or dust box 15 coincides with the opening in the neck of the retort 11. An airtight joint is effected between the connector 17 and the open end of the retort 11 by means of a luting 19 of clay or other suitable material, a similar joint having been made previously between the connector 17 and the condenser 15 by means of a luting 20. The condenser 15 is provided with thin walls made of a strong, heat-conducting material, such as sheet iron, and is provided with a door 22 for the removal of zinc dust from the interior of the condenser.

When the charge of impure zinc and iron has been introduced into the retort 11 and the neck 17 has been sealed to the retort 11 by the luting 19, the temperature of the furnace 13 is raised to a point where the zinc distils from the charge but the impurities contained therein do not distil with the zinc. The resulting zinc vapor passes through the neck 17 into the interior of the condenser or dust box 15, where it is suddenly chilled by the relatively cool atmosphere therein and is immediately condensed in the form of extremely fine particles, termed zinc dust. Since the walls of the condenser 15 are made of a thin heat-conducting material, the heat carried into the condenser by the zinc vapor is rapidly dissipated and the temperature of the atmosphere within the condenser is maintained at a point sufficiently low to cause the zinc vapor which enters the condenser to condense in the form of zinc dust throughout the operation of the process. After a short time, the oxygen which is in the condenser at the beginning of the distillation becomes practically exhausted due to chemical combination with the first portions of zinc which enter the condenser and the remainder of the zinc from that particular charge is condensed in a substantially inert atmosphere.

The distillation of the zinc and the condensation thereof into zinc dust is continued until the zinc in the retort 11 is almost exhausted, when the furnace is shut off, and the retort is disconnected from the condenser and allowed to cool. In order to cause the zinc to be condensed in the form of solid particles, the average temperature of the atmosphere within the condenser 15 must always be below that of the melting point of zinc (420° C.) and during the distillation the temperature of the furnace 13 is regulated in accordance with the temperature within the condenser. Whenever the temperature within the condenser begins to approach that of the melting point of zinc, the furnace is regulated to slow up the distillation and, conversely, when the temperature within the condenser falls too low the distillation is speeded up in order that the process may be carried out as rapidly and efficiently as possible.

In order to determine the temperature of the zinc vapor within the condenser, a thermocouple (not shown) is inserted in the top of the condenser 15 at about the center thereof and is connected with an automatic temperature recording device (not shown), whereby the temperature within the portion of the condenser adjacent the thermocouple is continuously recorded. Suitable types of thermocouples and temperature-recording devices are well-known and, since the particular construction of these devices forms no part of the invention, it is not necessary to describe them in detail.

It has been found that if the charge in the retort is heated until all of the zinc in the charge is distilled, the bulk of the lead in the charge is held therein by the iron during practically all of the distillation period, but that a substantial quantity of lead distils over with the last portions of the zinc. Although it is difficult to determine definitely what causes the iron in the charge to inhibit the distillation of lead, it is believed that a zinc-lead-iron alloy is formed in the charge which reduces the vapor pressure of the lead. As a result, the zinc distils over for a considerable period with a lead content materially less than would be the case if the iron were omitted from the charge and this condition will prevail until the supply of free zinc in the charge becomes almost exhausted. When the amount of free zinc becomes depleted, the vapor pressure of the zinc decreases, the vapor pressure of the lead increases and some lead is distilled with the zinc. Probably the lead is held in the zinc-lead-iron alloy until the free zinc reaches a certain value when the alloy is decomposed and releases the lead. Whatever the correct explanation of the phenomenon may be, the process provides a practical way of retarding the distillation of lead from impure zinc containing lead and the invention is not to be limited by the theory outlined herein.

In order to avoid the distillation of an undesired quantity of lead with the zinc, the distillation is stopped before the zinc in the charge is completely exhausted. It has been observed that the temperature of the zinc vapor in the condenser suddenly falls at about the time the transformation from the distillation of substantially pure zinc to the distillation of substantial quantities of lead along with the zinc occurs. This rapid fall in temperature is probably caused by a decrease in the quantity of zinc vapors that reaches the condenser and provides a convenient means of determining when to end the distillation of the charge.

After the apparatus has been in operation long enough to learn its characteristics, the approximate time required to distil the zinc from a given charge in the retort 11 may be readily estimated and when the distillation period is about over the temperature chart of the recording thermometer is observed in order that the distillation operation may be stopped at the desired point. The end point of the distillation is determined by noting on the record of the temperature within the condenser the point at which the temperature begins to fall rapidly even though the furnace is operating at a normal temperature. When the temperature suddenly falls, distillation is stopped by shutting off the furnace and disconnecting the condenser from the retort. After the retort has cooled sufficiently the residue of the charge is removed from the retort, a fresh charge of impure zinc and iron is introduced therein, the condenser is again connected to the retort and the above described operations are repeated.

Although the size and relative proportions of the parts of the apparatus used to practice the invention may be varied, it has been found that satisfactory results may be obtained by employing a retort holding a charge of about 3500 pounds of impure zinc and by providing a furnace and condenser of the requisite sizes and proportions to permit the distillation and condensation of this charge in about eighteen hours. Assuming that the charge of 3500 pounds of impure zinc contains from 1.25 to 1.5% of lead, a sufficient quantity of iron, such as scrap iron, is included in the charge to provide about 3.5 parts of iron for each part of lead in the charge. That is, if the charge of scrap zinc is free of iron, from about 155 to 185 pounds of scrap iron are added to the charge. If the charge of scrap zinc contains iron as an impurity, the amount of scrap iron added is reduced accordingly. Scrap zincs from different sources may contain varying amounts of iron as impurities and scrap materials of this character may be mixed with each other and with scrap iron in such proportions that the resulting mixture contains about 3 to 4 parts of iron per part of lead therein.

It has also been found that a very satisfactory zinc dust which is of great fineness and uniformity may be produced by employing a condenser large enough to hold the zinc dust produced from ten charges in a retort having a capacity of 3500 pounds of impure zinc. When the condenser is sufficiently filled with zinc dust from a number of furnace charges the door 22 is opened and dust is removed.

When apparatus of the type just described is employed in the manufacture of zinc dust, the sequence of events which occur may be followed by referring to the chart shown in Fig. 2 of the drawings. This chart represents the record made during a complete cycle of the process by the automatic temperature recorder of the temperature within the upper portion of the condenser as determined by the thermocouple positioned therein. The numbers around the circumference of the chart designate time in hours, while the numbers along the substantially radial lines indicate temperature in degrees centigrade. The record illustrated was started at the point X and ended at the point Y with the recording pen moving relative to the chart in the direction indicated by the arrow. Along the portion A—B of the temperature curve on this chart, the condenser has just been disconnected from the retort after one charge has been distilled and, consequently, the temperature within the condenser is falling. This represents that period in the cycle during which the retort is cooling off, is being cleaned and is being refilled with a fresh charge of impure zinc and iron.

At about the point B the condenser is connected to the retort and the furnace started up again, and at about the point C distillation begins. The temperature within the condenser then immediately begins to rise and continue to rise until it reaches a value indicated by letter D, that is in the vicinity of 350° C. The furnace is so regulated that the temperature of the zinc vapor within the condenser which is adjacent the thermocouple is maintained at approximately 350° C. and this condition prevails until the point indicated by the letter E on the temperature curve is reached. At this point the temperature curve takes a very decided drop, although the furnace is still operated at its normal temperature, and when this occurs the distillation is stopped by shunting off the furnace and disconnecting the condenser from the retort.

It will be observed that the entire cycle takes approximately twenty-four hours and that the portion of the cycle during which distillation takes place requires about eighteen hours. When almost eighteen hours of the distillation period have elapsed, the operator of the apparatus watches the temperature record made by the recording apparatus on the chart in order that he may note when the temperature curve shows a definite dropping off, although the furnace is still operating normally, whereupon he immediately stops the process.

By practicing the method just described, the bulk of the lead is retained in the residue left in the retort and the zinc dust is substantially free of lead. The zinc dust produced by this method usually contains less than .1% of lead, and almost never contains more than .15% lead. Obviously, when retorts and condensers of different sizes are employed, the various phases of the cycle will require different periods of time for completion. Nevertheless, the process is preferably practiced in such manner that the distillation operation is stopped before substantial quantities of lead are distilled.

When it is desired to produce zinc spelter instead of zinc dust, the condenser 15 is replaced by a smaller condenser designed to condense the zinc vapor in the form of a liquid or a solid instead of in very fine particles. Condensers suitable for this purpose are well-known in the art and many types of condensers are used for producing spelter. One type of condenser which is satisfactory is illustrated in Fig. 3 of the drawings, in which 113 indicates generally an oil-fired furnace in which a retort 111 is positioned. A condenser 115 is held in position adjacent the retort 111 by any suitable means, such as chains 116—116, connected to any suitable support, such as a chain hoist (not shown). The condenser 115 is connected to the retort 111 by means of a connector 117 and an airtight joint is effected between the connector 117, the retort 111 and the condenser 115 by means of lutings 119 and 120 of clay or other suitable material. The condenser 115 comprises a cylindrical iron casing 127 which is closed at one end by a plate 132 and which is in the form of a truncated cone 135 at the opposite end to provide a neck portion for the entrance of zinc vapor. The retort is lined with a refractory lining 128 made of a suitable heat insulating material, such as tile made in suitable shapes, which retards the flow of heat from the zinc vapor entering the retort to the exterior thereof. The condenser is provided with an opening 130 to permit the exit of gases from the condenser, if desired, and with a tap hole 131 through which liquid zinc, which collects in the condenser, may be tapped off when desired. The tap hole 131 is normally closed by a plug of any refractory material, such as clay, and the opening 130 may also be plugged up in a similar manner if desired. When it is desired to gain access to the interior of the condenser to clean it or repair the lining, the end plate 132 may be removed by disconnecting bolts 133—133. Likewise, the truncated end portion 135 may be removed by disconnecting bolts 136—136.

In the operation of this apparatus, the retort 111 is partly filled with a charge 110 of impure zinc and about three to four parts of iron per part of lead in the charge, and the retort is heated to cause the distillation of the zinc from the charge. The zinc vapor which is produced passes through the connector 117 into the condenser 115 where it is cooled sufficiently to convert it into the liquid state. The condensed liquid zinc which collects in the bottom of the condenser 115 is tapped off at intervals through the tap hole 131 into a ladle and is cast into slabs.

Since the zinc collected in the condenser 115 is removed from time to time, it is possible to continue the process until all of the zinc in the charge is distilled, if desired. In this case the zinc collected in the last fraction of the distillate would not be mingled with that collected in previous fractions because the last fraction would contain a substantial quantity of lead. Or, the process can be stopped, as is done in the manufacture of zinc dust, at the point where the lead begins to distil over in appreciable quantities. By either process zinc spelter which is substantially free of lead is produced.

While specific types of apparatus by means of which the invention may be practiced have been described, it is of course to be understood that the process may be performed in different kinds of apparatus. Furthermore, the process may be varied in a number of particulars without departing from the invention. For example, the charges which are introduced into the retorts 10 and 110 need not necessarily be charges of solid material, but the impure zinc may be introduced into the retorts either intermittently or continuously in the liquid state. Where it is not essential that the zinc produced be substantially free from lead, but it is desired to have the lead content therein at a low value, the amount of iron in the charge may be proportionately reduced. In this event, the resulting product will contain substantial amounts of lead but the lead will be present in smaller quantities than would be the case if no iron were included in the charge.

While in the foregoing description emphasis has been placed on the quality of the zinc dust or zinc spelter produced and the uniformity of the product, another important advantage of the invention is that it permits the zinc to be distilled at a more rapid rate than would be permissible if no metal were added to the charge which inhibits the distillation of the lead. The invention thus permits the production of a better quality and more uniform zinc than that hitherto produced from similar materials and at the same time permits a greater output of zinc over a given period of time than was heretofore obtainable from the same equipment.

What is claimed is:

1. The method of producing zinc, which comprises distilling zinc from a charge containing zinc contaminated with lead and sufficient iron to substantially completely inhibit the distillation of any of the lead in the charge, and condensing the resulting zinc vapor.

2. The method of producing zinc dust, which comprises distilling a charge containing zinc contaminated with lead and sufficient iron to substantially completely inhibit the distillation of any of the lead in the charge, and condensing the resulting zinc vapor under such conditions that the zinc solidifies in the form of dust.

3. The method of producing zinc spelter, which comprises distilling a charge containing zinc contaminated with lead and sufficient iron to substantially completely inhibit the distillation of any of the lead in the charge, and condensing the resulting zinc vapor under such conditions that it collects in a liquid body.

4. The process of producing zinc having a low lead content, which comprises distilling zinc from zinc-bearing material in the presence of sufficient iron to substantially completely inhibit the distillation of any of the lead, condensing the resulting zinc vapors, continuing the distillation until the proportion of lead which distils with the zinc reaches a predetermined value, and then stopping the process.

5. The process of making zinc dust, which comprises distilling zinc from zinc-bearing material in the presence of sufficient iron to substantially completely inhibit the distillation of any of the lead, condensing the resulting zinc vapor under conditions suitable to produce zinc dust, and stopping the process prior to the point where lead begins to appear in the zinc dust in undesired quantities.

6. The process of producing purified zinc from zinc-bearing material containing lead, which comprises distilling a charge containing said material and sufficient iron to provide about 3 to 4 parts of iron per part of lead in said material, and condensing the resulting zinc vapor.

7. The process of making zinc dust from zinc-bearing material containing lead, which comprises distilling a charge containing said material and sufficient iron to provide about 3 to 4 parts of iron per part of lead in said material, and condensing the resulting zinc vapor under such condition that the zinc solidifies in the form of dust.

8. The process of making zinc spelter from zinc-bearing material containing lead, which comprises distilling a charge containing said material and sufficient iron to provide about 3 to 4 parts of iron per part of lead in said material, and condensing the resulting zinc vapor under such conditions that it collects in a liquid body.

9. The process of producing purified zinc from zinc-bearing materials containing lead, which comprises charging a retort with a charge consisting of such zinc-bearing material and iron in the ratio of about 3 to 4 parts of iron to each part of lead contained therein, distilling said charge, condensing the resulting zinc vapor, and stopping the process prior to the point where the lead begins to distil with the zinc in undesired quantities.

10. The process of making zinc dust from zinc-bearing materials containing lead, which comprises charging a retort with a charge consisting of such zinc-bearing material and iron in the ratio of about 3 to 4 parts of iron to each part of lead contained therein, distilling said charge, condensing the resulting zinc vapor under such conditions that the zinc solidifies in the form of dust, and stopping the process prior to the point where the lead begins to distil with the zinc in undesired quantities.

11. The process of making zinc spelter from zinc-bearing materials containing lead, which comprises charging a retort with a charge consisting of said zinc-bearing material and iron in the ratio of about 3 to 4 parts of iron to each part of lead contained therein, distilling said charge, condensing the resulting zinc vapor under such conditions that the zinc collects in a liquid body, and stopping the process prior to the point where the lead begins to distil with the zinc in undesired quantities.

12. The method of producing zinc, which comprises distilling zinc from a charge containing zinc contaminated with lead and sufficient iron to substantially completely inhibit the distillation of any of the lead, condensing the resulting vapor, and stopping the process before all of the zinc has been distilled from the charge but after the major portion of the zinc has been distilled therefrom, whereby the zinc produced is substantially free of lead.

13. The method of producing zinc, which comprises preparing a charge containing iron and zinc contaminated with lead in which the amount of iron bears a definite relationship to the amount of lead therein determined by the degree of freedom from lead desired in the finished product, heating the charge to distil zinc therefrom, and condensing the resulting zinc vapor.

14. The method of producing zinc from lead-bearing zinc scraps containing iron in varying proportions, which comprises mixing the zinc scraps with each other and with substantially pure iron in such proportions that the resulting mixture contains about 3 to 4 parts of iron per part of lead therein, heating the mixture to distil zinc therefrom, and condensing the resulting zinc vapor.

15. The method of producing zinc from impure zinc containing lead, which comprises mixing the impure zinc with sufficient scrap iron to provide about 3.5 parts of iron per part of lead in the zinc, heating the resulting mixture to distil zinc therefrom, and condensing the resulting zinc vapor.

16. The method of making zinc spelter, which comprises distilling zinc from a charge containing zinc contaminated with lead and sufficient iron to substantially completely inhibit the distillation of any of the lead, collecting the major portion of the condensed zinc in one body, and collecting the last portion of the condensed zinc in another body, whereby the bulk of the spelter produced is substantially free of lead.

17. The process of producing zinc dust of low lead content and of uniform quality, which comprises introducing into a retort a charge containing zinc, lead, and sufficient iron to substantially completely inhibit the distillation of any of the lead, heating the retort to distil the zinc from said charge, conducting the resulting zinc vapor into a large heat conducting condenser whereby the vapor is condensed in the form of dust, regulating the heat applied to the retort so that the temperature at a given point within the condenser is substantially uniform, continuing the aforementioned operation until the temperature at said point falls rapidly, and then stopping the process.

18. The process of producing zinc dust of low lead content and of uniform quality, which comprises introducing into a retort a charge containing zinc, lead, and about 3 to 4 parts iron per part of lead therein, heating the retort to distil the zinc from said charge, conducting the resulting zinc vapor into a large heat conducting condenser whereby the vapor is condensed in the form of dust, regulating the heat applied to the retort so that the temperature at a given point within the condenser is substantially uniform, continuing the aforementioned operation until the temperature at said point falls rapidly, and then stopping the process.

19. The method of producing purified zinc, which comprises distilling a charge containing zinc-bearing material, lead and sufficient iron to substantially completely inhibit the distillation of any of the lead in the charge.

20. The method of producing zinc, which comprises adding to a charge of zinc-bearing material contaminated with lead a sufficient quantity of iron to substantially completely inhibit the distillation of any of the lead in said material, and heating the charge to distil the zinc therefrom.

LOUIS SCOTT DEITZ, JR.
BERNARD MANSFIELD.